Jan. 4, 1927.
J. P. THOMASON
1,612,840
VIBRATION CHECK FOR AUTOMOBILES
Filed Jan. 26, 1926
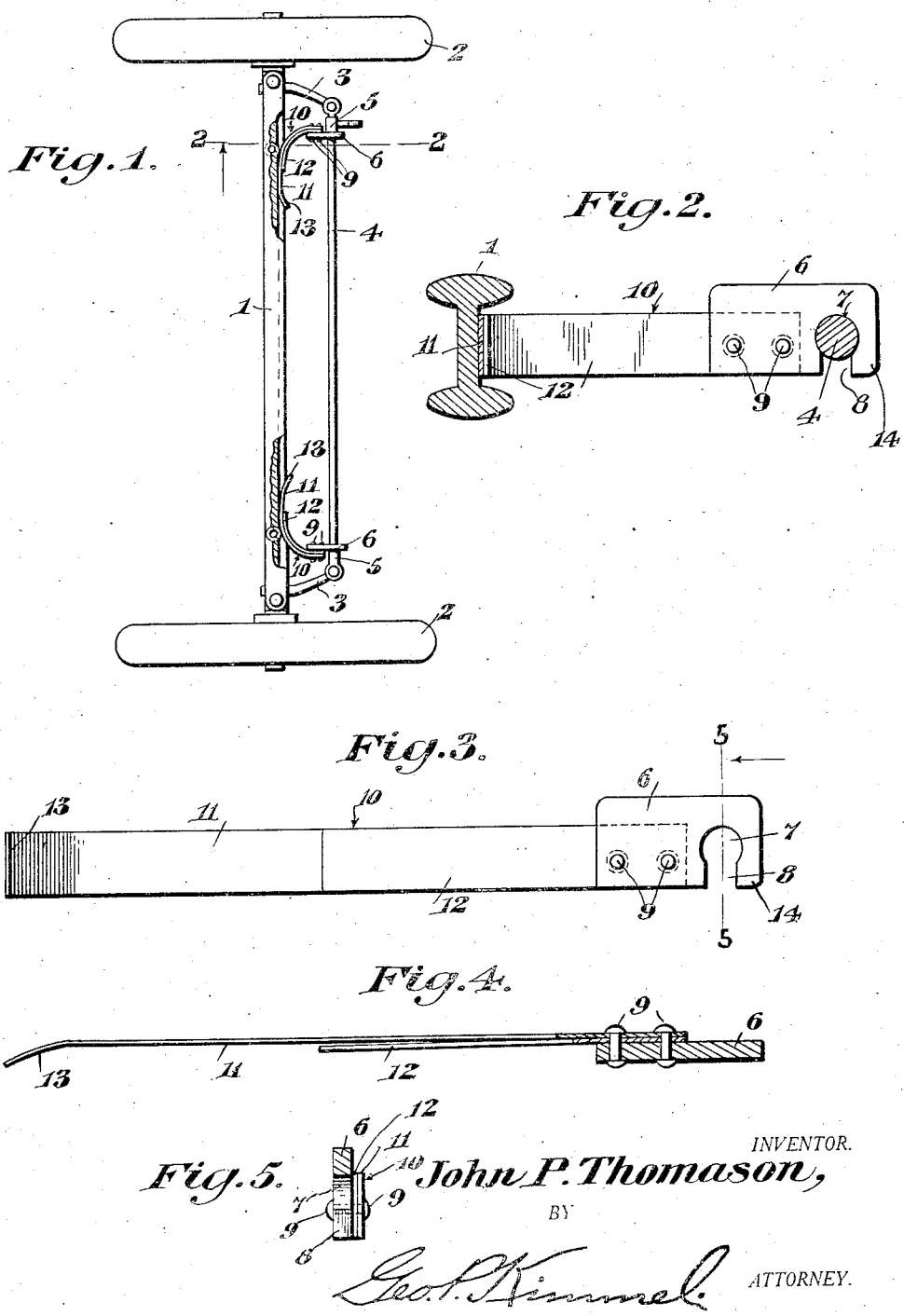
INVENTOR.
John P. Thomason,
BY
Geo. P. Kimmel.
ATTORNEY.

Patented Jan. 4, 1927.

1,612,840

UNITED STATES PATENT OFFICE.

JOHN P. THOMASON, OF PHOENIX, ARIZONA.

VIBRATION CHECK FOR AUTOMOBILES.

Application filed January 26, 1926. Serial No. 83,904.

This invention relates to automobile accessories and pertains particularly to a vibrating check for automobiles designed especially for use upon Ford cars.

The primary object of this invention is the provision, in a manner as hereinafter set forth, of an improved type of holding device adapted to engage the spindle connecting rod of an automobile and bear against the axle adjacent thereto, to prevent wobbling of the steering wheel and rattling of the front running gears, usually due to worn bearings or connections between the parts of the steering apparatus.

The invention has for another object the provision of a device of this character which may be easily applied to a vehicle, will be strong and durable, will not interfere with the steering of the vehicle, and will be inexpensive to manufacture and apply.

The invention will be best understood from a consideration of the following detailed description taken in connection with the accompanying drawing forming a part of this specification, with the understanding that the invention is not confined to any strict conformity with the showing of the drawing, but may be changed and modified so long as such changes and modifications mark no material departure from the salient features of the invention as expressed in the appended claims.

In the drawing:—

Figure 1 shows the front axle, wheels and a portion of the steering gear of an automobile, showing the device embodying this invention applied thereto.

Figure 2 is a transverse section taken upon the line 2—2 of Figure 1.

Figure 3 is a side elevation of the device embodying this invention.

Figure 4 is a top plan view of the same, shown partly in section and.

Figure 5 is a transverse section taken upon the line 5—5 of Figure 3.

Referring now to the drawing in details wherein like numerals of reference indicate corresponding parts throughout there is indicated by the numeral 1 an automobile front axle which, as shown in Figure 2 is of I beam construction. At each end of the axle 1 there is mounted, on the usual spindles which are not shown in these figures, the front wheels 2 and extending rearwardly from these spindles upon which the wheels are mounted, are the usual spindle arms 3.

Connecting between the ends of the spindle arms 3 is the spindle connecting rod 4, upon each end of which is removably secured the spindle connecting rod yoke 5, by means of which the ends of the connecting rod are attached to the rearwardly directed ends of the spindle arms 3.

The device embodying this invention comprises a relatively heavy substantially rectangular shaped plate 6, having an aperture formed therethrough adjacent one end thereof, as at 7 and this aperture opens through one side edge of the plate 6 through the constricted mouth passage 8. As is shown the width of this passage is less than the width or diameter of the circular aperture 7 and opening into the latter. It will be apparent that the aperture 7 and the passage 8 constitute a key-hole shaped slot.

Securely fixed to the plate 6 as by the rivets 9 or by other appropriate means, is a spring steel arm indicated generally by the numeral 10 and formed in two sections, namely, sections 11 and 12, respectively. These sections of spring steel are placed side by side as shown in Figure 4 and the rivets or securing members 9 are passed directly through the ends of the same as is also clearly shown.

One of the members, as for example the mmeber 11, is of materially greater length than the other member of the member 12, the same here shown as being substantially twice as long as the shorter member 12 and this member 11 has its outer free edge slightly curved or hooked as at 13, the purpose for which will become apparent upon further description of the device.

As is shown in Figure 1, these devices are used in pairs, there being provided right and left hand ones for each vehicle. When applying the device, the plate 6 is attached to the connecting rod 4 as is shown in Figure 2, and this may be accomplished either by the forcing of the rod through the passage 8 until it positions in the aperture 7, the force acting to spring out the tongue portion 14 to allow the passage of the rod or, the spindle connecting rod yoke may be removed from the connecting rod 4 and the rod extended through the passage 7.

When the pair of devices are in position, the spring arm 10 is bent or sprung inwardly until the same can be positioned in the channel of the I beam axle, against the web thereof as is shown in Figure 1 and as is also shown, the ends of these spring arms are directed toward one another from each end of the spindle connecting rod.

By means of the devices shown and described, the connecting rod 4 is rigidly held and prevented from rattling or shaking and the wheels 2 will therefore be prevented from wobbling when the machine is being driven over uneven ground, particularly if the connections between the various members of the steering apparatus are worn loose. Upon turning of the wheels 2, the spring arms 10 will bend and slide in the channel of the axle thus always holding the steering apparatus steady but not interfering at all with the operation of the same.

From the foregoing description it will be readily seen that a device of unique and novel construction has been provided for holding the steering apparatus of an automobile steady at all times thus preventing the annoying shaking and wobbling so frequently seen in machines having loose steering gears and also thus decreasing the liability of accident.

Having thus described my invention what I claim is:—

1. A vibration check for automobiles, comprising a head having a key-hole shaped slot opening through one of its longer edges, and adapted to detachably receive the spindle connecting rod of the automobile with the plate frictionally gripping said rod, and spring leaves carried by the plate and adapted to play against the front axle of said automobile.

2. A vibration check for automobiles comprising a plate-like head having a key-hole shaped slot opening through one of its longer edges and adapted to detachably receive the spindle connecting rod of the automobile with the plate frictionally gripping said rod and spring means carried by the plate and adapted to play against the front axle of said automobile.

In testimony whereof, I affix my signature hereto.

JOHN P. THOMASON.